June 30, 1970  J. P. HORTON  3,517,602
BARBECUE COOKER
Filed July 8, 1968
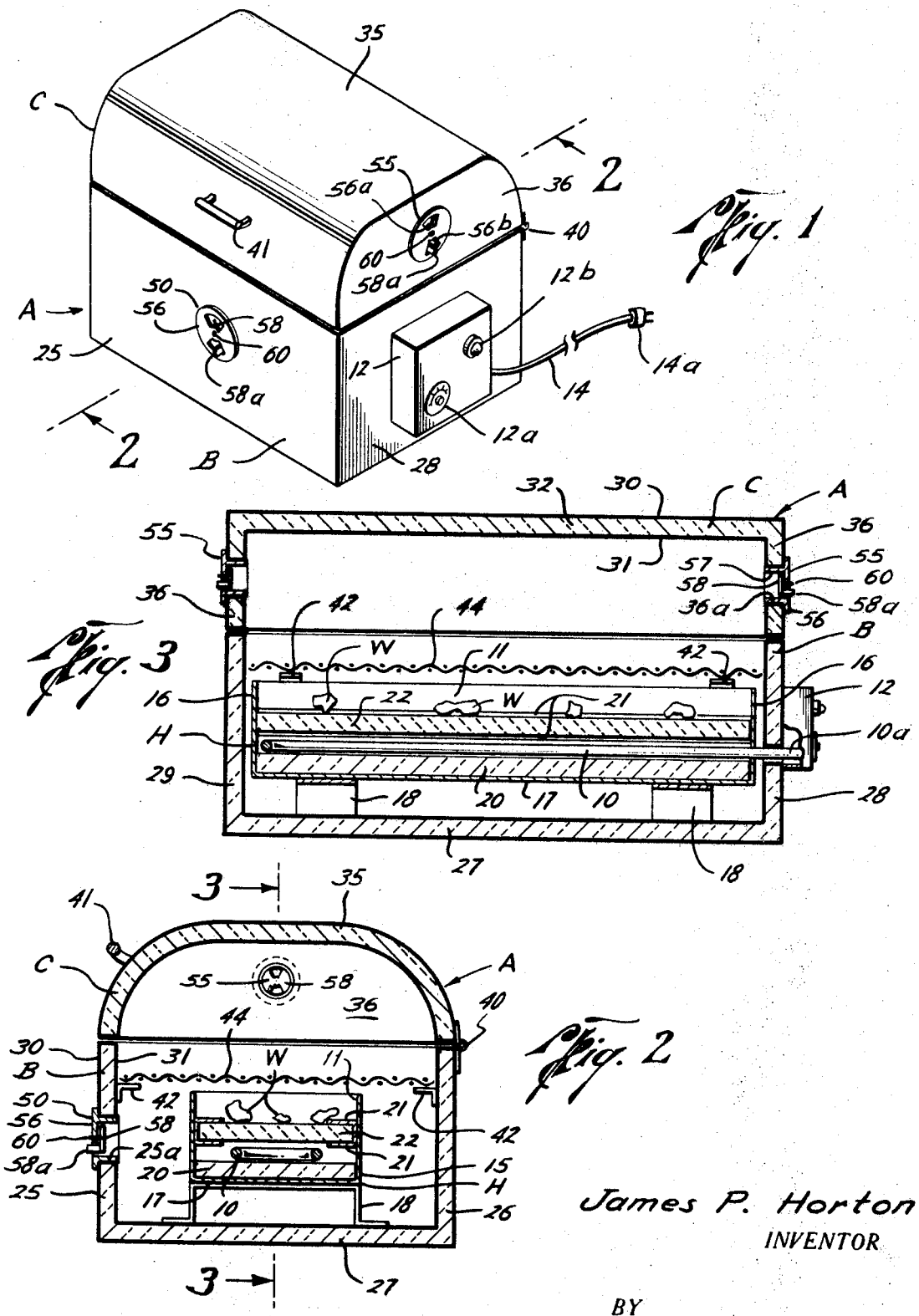
James P. Horton
INVENTOR
BY
Hayden Pravel Wilson & Matthews
ATTORNEYS

United States Patent Office 3,517,602
Patented June 30, 1970

1

3,517,602
BARBECUE COOKER
James P. Horton, 1505 E. Lantrip,
Kilgore, Tex. 75662
Filed July 8, 1968, Ser. No. 743,240
Int. Cl. A47j 47/02
U.S. Cl. 99—259      5 Claims

ABSTRACT OF THE DISCLOSURE

A barbecue cooker having a combination of electric heating and wood burning for the barbecuing of meat to obtain the benefits of cooking over a wood fire and wood-smoke while eliminating the disadvantages associated therewith.

BACKGROUND OF THE INVENTION

The field of this invention is barbecue grills or cookers.

For a number of years, it has been customary to barbecue meat, such as beef, chicken and fish, over a large pit-type barbecue grill made of bricks or similar materials and in which hickory logs or other wood has been used. Hickory logs are preferred because they produce a smoke which improves the taste of the meat being barbecued. Very few other woods can be satisfactorily used, and some people refuse to use any wood except hickory. As a result, this type of barbecue cooking is limited to those areas where hickory wood is prevalent and relatively inexpensive since a large quantity of such logs must be used in the pit-type cookers to develop the proper cooking conditions.

In smaller types of barbecue grills, such as those made from metal, it is normally impractical to use hickory logs even if cut down to relatively small diameters because of the quantity of wood required to build up an adequate heat and a minimum flame in proximity to the meat being cooked. Charcoal is therefore commonly used today in barbeque grills, because of its availabity and slow cooking with a small quantiy of charcoal. Hickory chips are somtimes thrown into a charcoal fire to attempt to get the benefit of the hickory smoke, but flavoring from the hickory smoke is usually minimal and largely obscured due to its mixture with the charcoal smoke.

SUMMARY OF THE INVENTION

The present invention provides a barbecue cooker which obtains a predominant hickory smoke in the cooker with a minimum of hickory wood and with adequate heat to properly cook the meat being barbecued. Additionally, the meat is cooked evenly due to controlled heating, it is not dried out, it does not steam or sour, and the cooker is more sanitary than prior barbecue cookers.

BRIEF DESCRIPTION OF THE DRAWINGS

FIG. 1 is an isometric view of the preferred form of the barbecue cooker of the preesnt invention, shown in the closed cooking position;

FIG. 2 is a sectional view taken on line 2—2 of FIG. 1 to illustrate further details of the cooker of this invention; and FIG. 3 is a sectional view taken on line 3—3 of FIG. 2 to further illustrate the invention.

DESCRIPTION OF THE PREFERRED EMBODIMENT

In the drawings, the letter A designates generally the barbecue cooker of the present invention which includes a lower cooking compartment B and a cover C, with an heating and cooking assembly H disposed therein.

2

As will be explained in detail hereinafter, the heating and cooking assembly H includes an electrical heating element or elements 10, in combination with a tray 11 which is adapted to hold chips or small pieces of hickory wood W so that controlled heating together with the production of smoke from the hickory wood W is accomplished, together with other advantages hereinafter explained.

Considering now the details of the preferred form of the barbecue cooker A of this invention, the electrical heating element 10 is preferably in the form of a U or loop with the end 10a connected electrically to a thermostatic control 12 of conventional construction. Such thermostatic control 12 is connected by a conventional electrical wire 14 and plug 14a to any suitable outlet or plug for providing 110 volts alternating current, or any other suitable voltage. The thermostatic control 12 preferably has a dial 12a for setting the temperature of operation within the cooker A so that the element 10 is automatically cut on and off in accordance with such temperature. A bulb or light 12b is also preferably provided with the thermostatic control 12 for indicating when the heating element is in the "on" position. It will be understood that additional controls, or fewer controls may be provided within the scope of this invention for such heating element 10, but it is preferred to have a thermostatic control such as indicated at 12 so that the temperature level within the cooker A is maintained at a predetermined amount.

For supporting the heating element 10 and for forming the tray 11 thereabove, the assembly H is preferably made with side walls 15 (FIG. 2) and end walls 16 of sheet metal which are welded or are otherwise secured together. The side walls 15 and the end walls 16 are also welded or are otherwise secured to a bottom sheet metal plate 17 which is resting upon and is preferably welded or otherwise secured to supporting legs 18. A layer of asbestos or other heat insulating material 20 is supported on the bottom plate 17. The heating element or elements 10 are disposed above the insulating layer 20 so that heat from the element 10 is prevented from being dissipated downwardly in the cooker A. A pair of side brackets 21 are welded or are otherwise secured internally of the side walls 15 for receiving and holding one or more sections of firebrick 22, upon which the hickory wood W is adapted to rest. It is noted that the upper surface of the firebrick 22 serves as the lower surface of the tray 11. The walls of the tray 11 are formed by the upper portions of the side walls 15 and the end walls 16 and they are merely for the purpose of confining the hickory wood W on the firebrick 22 above the heating elements 10. The firebrick 22 prevents the heat from the hickory wood W from damaging the heating element 10 while also serving to transmit the heat from the element 10 into the interior of the compartment B and the cover C.

The walls of the compartment B and the cover C are preferably constructed of double metal layers with heat insulation therebetween. Thus, the lower cooking compartment B is formed with front wall 25, rear wall 26, bottom 27 and end walls 28 and 29, each of which is made of an outside layer or skin of sheet metal 30. Each of such walls or portions of the compartment B also includes an inner metal sheet metal layer 31 which is spaced inwardly from the outer sheet metal layer 30 with a layer of heat insulation material 32 therebetween. Both of the metal layers 30 and 31 may be made of stainless steel or similar material while the heat insulation material may be asbestos or any other known insulating material.

The cover C is preferably formed with a curved top 35 which may be somewhat flattened as shown in the drawings, or it may be more curved as desired. Also, the cover C has ends 36 which are welded or otherwise secured to the top 35. The top 35 and ends 36 are formed in the same manner as the walls of the compartment B and therefore the metal layers 30 and 31 have been indicated for the cover C together with the insulation 32 therebetween. With such construction, the entire barbecue cooker A is completely insulated when the cover C is in the closed position as shown in the drawing.

The cover C may be secured to the compartment B in any suitable manner or may simply be loosely positioned thereon, but preferably the cover C is connected to the compartment B by a hinge 40 of conventional construction which permits the cover C to be pivoted upwardly to an open position about the hinge 40. A handle 41 is also preferably provided on the cover C for raising and lowering same about the hinge 40.

Within the lower compartment B, a plurality of grate supports 42 are welded or are otherwise secured to the interior sheet metal 31. In the preferred form of the invention such supports 42 are formed by angle iron strips or sections, but any other suitable support may be utilized for holding a grate 44 thereon. The grate 44 may be of the woven wire type, expanded metal type, or any other similar construction for supporting the meats to be cooked in a position above the hickory wood W and the heating element 10. The grate 44 is preferably removable for cleaning and for ready access to the assembly H.

One of the important features of the present invention is a provision for circulation of air and smoke within the compartment B and the cover C during the barbecuing operation. This is effected by the provision of an inlet vent 50 in the lower or mid portion of the compartment B, and preferably at the front wall 25 as illustrated in FIGS. 1 and 2. Two outlet vents 55 in the ends 36 of the cover C are provided for the movement of the smoke and air outwardly. Any suitable means is provided for adjustably controlling the extent of the opening of the inlet vent 50 and the outlet vents 55. One type of conventional vent is illustrated in the drawings wherein a front plate 56 is secured to an inner cylinder 57 which fits into an opening 36a in the ends 36 for outlet vents 55 and into an opening 25a in the wall 25 for the inlet vent 50. The cylinder 57 may be welded or otherwise secured in the opening 36a or 25a, or it may simply be frictionally disposed therein. The front plate 56 is of a relatively large diameter so that it engages the external surfaces of the cover C in connection with the vents 55 and the front wall 25 in connection with the inet vent 50. Each of the plates 56 have riveted thereto a vent control plate 58 which is connected by a rivet 60. The vent control plate 58 has openings approximately 90° in arcuate extent and disposed diametrically opposite from each other (FIG. 2). The plate 56 has similar openings 56a and 56b (FIG. 1) which are adapted to be aligned with the openings in the control plate 58. Control plate 58 has a small tab 58a which may be readily moved by a person's fingers or other device to either align the openings in the plates 56 and 58 or to close the openings 56a, 56b by bringing the solid portion of the plate 58 into alignment therewith. For purposes of illustration, the inlet vent 50 is shown in a closed position (FIG. 1) whereas the inlet vent 55 in FIG. 1 is shown in the open position. It will be understood that the details of such construction may be varied so long as the vents 50 and 55 are provided in substantially the positions illustrated and in a form which renders them adjustable as far as openings are concerned.

In the use of the barbecue cooker A of this invention, relatively small pieces of the hickory wood W are disposed in the tray 11 where the heat from the electrical element 10 heats the wood enough to cause it to smoke without flame. Such hickory wood W is preferably green wood because of the improved taste effect from the use of such green wood. In any event, the heating element 10 and the wood pieces W are both caused to function at the same time by having the wood W burning and the heating element 10 turned on. The temperature at which the cooker A is to be operated is set on the thermostatic control 12a. The removable grill 44 is placed in position on the support 42 and then the meat is placed in a container on the grill or grate 44. The cover C is then moved to the closed position shown in the drawings and the inlet vent 50 and the outlet vents 55 are adjusted for controlling the amount of circulation of air and smoke within and through the cooker A. With such construction, the meat is cooked and heated with an even controlled heating at the same time a minimum amount of hickory wood W is utilized as compared to a pit type barbecue cooker. The disadvantages of using a charcoal fire are also eliminated. Because of the circulation of the smoke and air, the meat does not become dried out or soured due to steaming. During the cooking operation, the meat drippings, cooked from the meat, can be dripped into the tray or pan 11 where the chips W are located to increase the flavoring of the meat during the cooking operation. The meat drippings are burned clean from the firebrick 22 and the tray 11 by reason of the intense heat provided thereon by the heating element 10 and the wood chips W.

It will be appreciated that the cooker A is capable of being easily cleaned since the heating assembly H is spaced from the walls of the compartment B and all parts of the inside of the cooker A are available for cleaning purposes. The grate or grill 44 is removable for cleaning and this exposes the entire inside, including the tray 11 and the bottom of the compartment B. Although the cooker A of this invention may be made in various sizes, for residential or commercial uses, it is preferable to make it of a small enough size to render it portable. Because of the efficiency and effectiveness of the cooker A, even a relatively small size of the cooker A can be used for commercial operations.

I claim:
1. A barbecue cooker, comprising:
 (a) a cooking compartment having a side wall and a bottom;
 (b) a cover disposed on said cooking compartment for enclosing same;
 (c) a heating and cooking assembly mounted in said cooking compartment and including:
  (1) an electrical heating element; and
  (2) a tray positioned above said heating element for receiving wood;
 (d) an inlet vent in said side wall of said compartment; and
 (e) an outlet vent in each end of said cover for creating a circulation of smoke and air from said inlet vent through the interior of said compartment and said cover and then out through said outlet vents.
2. The structure set forth in claim 1, wherein:
 (a) said tray is made of metal and is adapted to hold wood pieces; and
 (b) a layer of firebrick is positioned above said heating element to prove a bottom for said tray for the wood pieces, whereby an improved heat transfer and distribution from the electrical heating element to the tray is effected.
3. The structure set forth in claim 1, wherein:
 (a) said compartment is rectangular in shape and said side wall is formed by a front wall, a rear wall, and end walls;
 (b) said front wall is provided with means for adjusting the size of the opening in said inlet vent;
 (c) said cover is formed by a curved top and ends disposed above said end walls of said compartment; and
 (d) the outlet vents are provided in said ends of said cover for circulation of smoke and air during the barbecuing operation with the cover closed.
4. The structure set forth in claim 1, wherein:
 (a) said tray is made of metal and is formed with retaining sides for confining wood pieces;

(b) a layer of firebrick is positioned above said heating element to provide a bottom for said tray for the wood pieces; and
(c) a layer of heat insulation below said electrical heating element to prevent heat loss in a direction away from the meat being barbecued.

5. The structure set forth in claim 1, wherein:
(a) said tray is made of metal and is formed with retaining sides for confining wood pieces;
(b) a layer of firebrick is positioned above said heating element to provide a bottom for said tray for the wood pieces;
(c) a layer of heat insulation below said electrical heating element to prevent heat loss in a direction away from the meat being barbecued; and
(d) thermostatic control means for controlling the operation of said electrical heating element in accordance with the temperature within said compartment and said cover.

References Cited

UNITED STATES PATENTS

| | | | |
|---|---|---|---|
| 3,088,393 | 5/1963 | Huckabee | 99—259 |
| 3,327,616 | 6/1967 | Ozymy | 99—260 |
| 3,333,526 | 8/1967 | Kirkpatrick | 99—260 |
| 3,375,775 | 4/1968 | Folmar | 99—259 |

ROBERT W. JENKINS, Primary Examiner